US006796210B2

(12) United States Patent
Baron

(10) Patent No.: US 6,796,210 B2
(45) Date of Patent: Sep. 28, 2004

(54) CUTTING DISC CORE FOR A CIRCULAR SAW BLADE

(76) Inventor: Kevin F. Baron, 1820 Crystal View Cir., Newbury Park, CA (US) 91321

(*) Notice: Subject to any disclaimer, the term of this patent is extended or adjusted under 35 U.S.C. 154(b) by 203 days.

(21) Appl. No.: 10/043,923

(22) Filed: Jan. 14, 2002

(65) Prior Publication Data

US 2003/0131708 A1 Jul. 17, 2003

(51) Int. Cl.$^7$ .............................. B26D 1/12; B28D 1/04; B24D 11/00
(52) U.S. Cl. .................... 83/676; 451/526; 451/527; 451/528; 451/541; 125/13.01; 125/15; 403/2
(58) Field of Search ................... 451/541, 547, 451/359, 508–510, 526–528, 533, 538, 539; 83/666, 665, 676; 125/13.01, 15; 403/2, 11, 12, 19; 206/554; 229/237

(56) References Cited

U.S. PATENT DOCUMENTS

| | | | | |
|---|---|---|---|---|
| 214,389 A | * | 4/1879 | Hill | 83/835 |
| 1,314,125 A | * | 8/1919 | Burlew | 451/541 |
| 1,711,102 A | * | 4/1929 | Sierra, Jr. | 83/848 |
| 2,406,553 A | * | 8/1946 | Mader | 403/383 |
| 2,600,459 A | * | 6/1952 | Adams | 83/665 |
| 2,649,868 A | * | 8/1953 | Gommel | 125/15 |
| 2,747,493 A | * | 5/1956 | Noll | 403/2 |
| 2,822,648 A | * | 2/1958 | Metzger et al. | 125/15 |
| 2,850,916 A | * | 9/1958 | Kingdon | 220/3.3 |
| 2,912,021 A | * | 11/1959 | Gommel | 83/676 |
| 3,541,910 A | * | 11/1970 | Murray | 83/676 |
| 3,772,831 A | * | 11/1973 | Shaw | 451/541 |
| 3,854,364 A | * | 12/1974 | Sundstrom | 83/835 |
| D261,868 S | * | 11/1981 | Fridl et al. | D9/438 |
| 4,302,035 A | * | 11/1981 | Ochwat | 174/65 R |
| D262,607 S | * | 1/1982 | Drolen et al. | D9/438 |
| 4,461,296 A | * | 7/1984 | Hodge | 606/176 |
| 4,570,517 A | * | 2/1986 | Souza et al. | 83/676 |
| 4,584,920 A | * | 4/1986 | Jansen-Herfeld | 83/698.41 |
| 4,785,655 A | * | 11/1988 | Pistritto et al. | 83/25 |
| 5,012,792 A | * | 5/1991 | Kawata et al. | 125/15 |
| 5,027,684 A | * | 7/1991 | Neukam | 83/665 |
| 5,191,171 A | * | 3/1993 | Bordwell | 220/3.2 |
| 5,444,183 A | * | 8/1995 | Gehrs et al. | 220/3.2 |
| 5,728,973 A | * | 3/1998 | Jorgensen | 174/65 R |
| 6,103,973 A | * | 8/2000 | Sharp | 29/825 |
| 6,264,056 B1 | * | 7/2001 | King | 220/484 |
| 6,321,627 B1 | * | 11/2001 | Taylor et al. | 83/676 |
| 6,450,075 B1 | * | 9/2002 | Manzo | 83/676 |
| 6,460,532 B1 | * | 10/2002 | Park | 125/13.01 |
| 6,736,712 B1 | * | 5/2004 | Horn | 451/359 |

FOREIGN PATENT DOCUMENTS

WO  WO-99/56904  * 11/1999

* cited by examiner

Primary Examiner—Allan N. Shoap
Assistant Examiner—Jason Prone
(74) Attorney, Agent, or Firm—Jack C. Munro

(57) ABSTRACT

A cutting disc core for a circular shaped saw blade which has a circular shaped body which has a center hole and a circular peripheral edge upon which is to be mounted a plurality of spaced apart cutting segments that is to perform the cutting of the saw blade. Surrounding the center hole and formed within the body are a plurality of slits with there being a solid tab that is integrally connected to the body located between each directly adjacent pair of slits. The tab constitutes a frangible seal with the circular ring or bushing which is formed about the center hole to be removable by being forcibly physically separated from the body.

1 Claim, 2 Drawing Sheets

US 6,796,210 B2

CUTTING DISC CORE FOR A CIRCULAR SAW BLADE

BACKGROUND OF THE INVENTION

1. Field of the Invention

The field of this invention relates to a cutting disc core that is to be utilized in forming of a rotary cutting blade with the core being constructed to have a variable size center hole which is used in mounting of the cutting blade on different diameters of arbors of cutting machines.

2. Description of the Related Art

In order to manufacture a circular saw blade, there is utilized a thin, metallic, disc shaped core with the cutting surface to be located on the periphery of the core. The core includes a center hole which is used to mount the saw blade to a motor operated device (saw machine) which will cause rotation of the blade. It is intended that the blade be rotated at a high speed when in contact with the structure that is being cut, which is generally cement, marble, stone, asphalt or other hard substance.

One particular common manufacture of saw machines utilizes a rotating shaft, or arbor, that is twenty millimeters in diameter, which is 0.787 inches. This size arbor is commonly used in conjunction with smaller or hand held machines. Larger machines, which require the operator to walk behind the machine (not hand held), generally utilize a slightly larger arbor with most machines having a one inch diameter arbor. Saw blades have been constructed to be connectable to a twenty millimeter arbor or a one inch arbor. This means for an operator that is utilizing both types of machines, the operator must purchase two different blade sizes. It would be desirable to construct a blade so as to be connectable with both sizes of arbors thereby eliminating the need to purchase blades for both sizes of arbors.

SUMMARY OF THE INVENTION

A first embodiment of cutting disc core for a circular saw blade of the present invention utilizes a circular shaped body having a center hole and a continuous peripheral edge. The peripheral edge is adapted to have cutting segments mounted thereon. A plurality of slits are formed within the body located directly adjacent the hole. These slits define a generally circular configuration surrounding the hole and are located directly adjacent the hole. The slits, in essence, form a circular ring which is integrally connected to the body by a plurality of solid tabs. The circular ring can be physically removed from the body by breaking of these tabs thereby increasing the size of the center hole to permit the mounting of the body on a larger size arbor of a sawing machine.

A further embodiment of the present invention is where the first embodiment is modified by each slit having ends which define a radially outward extension with there being a tab integrally formed with the body between an extension of one slit and an extension of an adjacent slit.

A further embodiment of the present invention is where the first embodiment is modified by each tab having a radially outward portion that is smaller in width than the base of the tab which is located in alignment with the slits. Breaking of each tab is thereby to occur at the radially outward portion since the radially outward portion is weaker than the base because the radially outward portion is shorter in width than the base. This means that no portion of the broken tab will extend within the confines of the center hole.

A further embodiment of the present invention is where the basic embodiment is modified by there being at least three in number of tabs.

A second embodiment of the present invention is where there is a cutting disc core for a circular saw blade which has a center hole defined by a bushing with this bushing being removably connected to the body by a plurality of frangible connections each of which are integral with the body.

A further embodiment of the present invention is where the second embodiment is modified by each frangible connection having a base located closest to the center hole and a radially outward portion located furthest from the center hole with breaking of the frangible connection to occur at the radially outward portion.

A further embodiment of the present invention is where the second embodiment is modified by there being at least three in number of tabs.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figure 1:
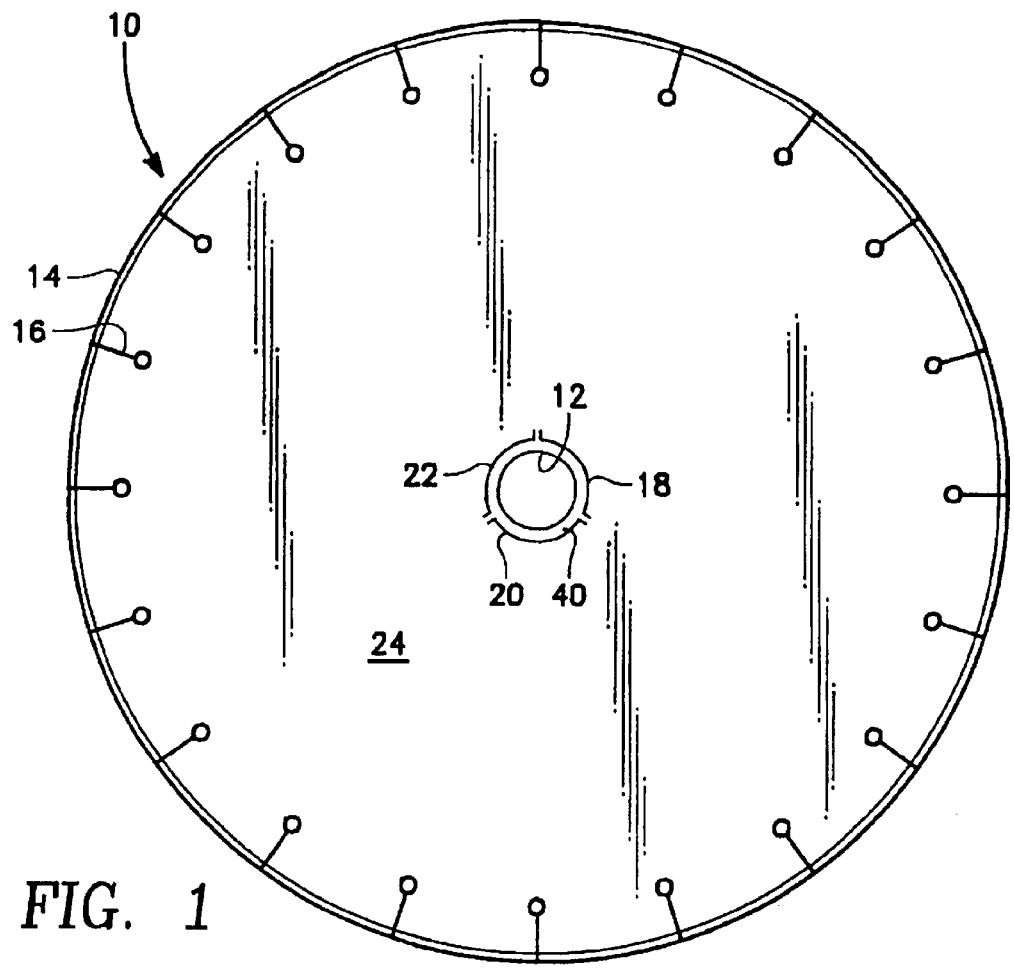
FIG. 1 shows a front view of the cutting disc core constructed in accordance with the present invention.

Referring particularly to the drawings, there is shown the cutting disc core 10 of this invention. The cutting disc core 10 takes the form of a circular shaped body which has an inner center hole 12. The inner center hole 12 is to be used to mount the core 10 onto a sawing machine to affect the rotation of the core 10. The sawing machine is not shown and is deemed to be conventional. The core 10 has a peripheral edge 14. Formed within the peripheral edge 14 are a plurality of radial slots 16. Twenty in number of the slots 16 is shown. However, the number of the slots 16 can be increased or decreased depending on the diameter of the core 10. The use of the radial slots 16 is deemed to be conventional and forms no specific part of this invention.

The portion of the peripheral edge 14 located between each directly adjacent pair of radial slots 16 is to define an area to which is to be laser welded a cutting segment (not shown). The mounting of the cutting segments on the core 10 is what produces the cutting blade. Surrounding the inner center hole 12 are a series of slits 18, 20 and 22. Each of the slits 18, 20 and 22 are arcuate and basically comprise about one hundred twenty degrees of a circle. Each of the slits 18, 20 and 22 are to be formed from some type of cutting device, such as a laser. The slits 18, 20 and 22 are to be formed entirely through the body 24 of the core 10.

Figure 2:
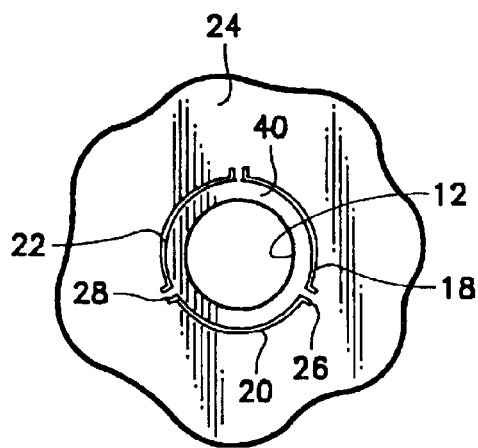
FIG. 2 is an enlarged view of the center hole formed within the cutting disc core of the present invention.
Figure 3:
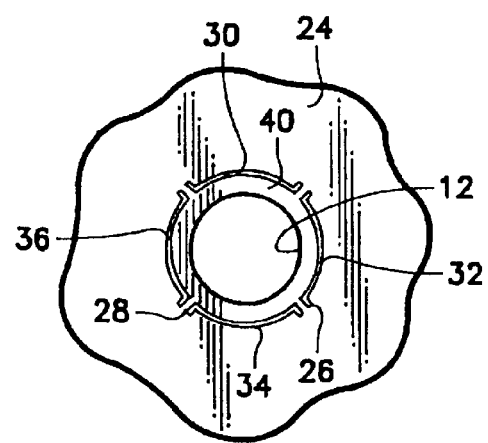
FIG. 3 is a view similar to FIG. 2 but of a modified form of center hole.
Figure 4:
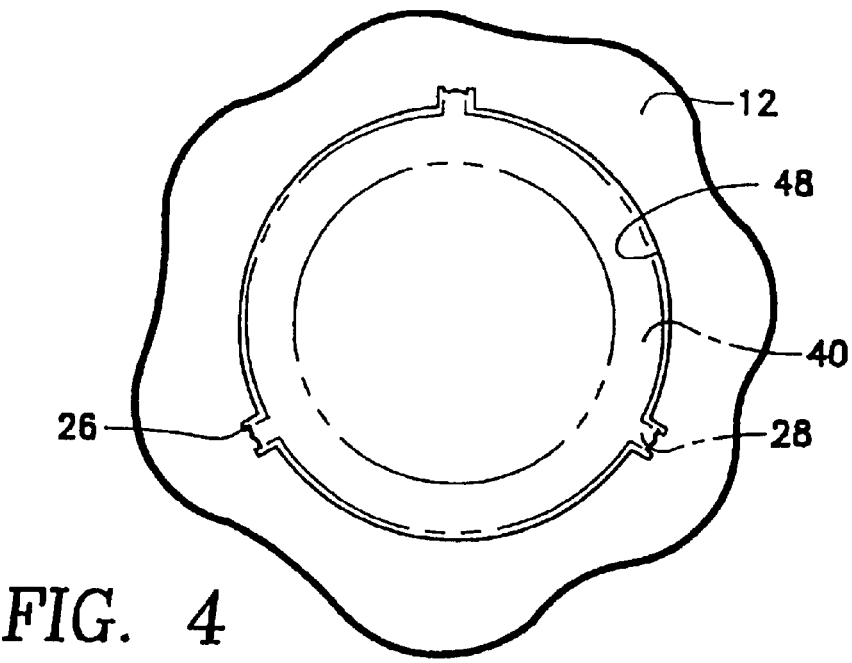
FIG. 4 is an enlarged view similar to FIG. 2 but where a circular ring or bushing that surrounds the center hole has been removed from the body of the core.
Figure 5:
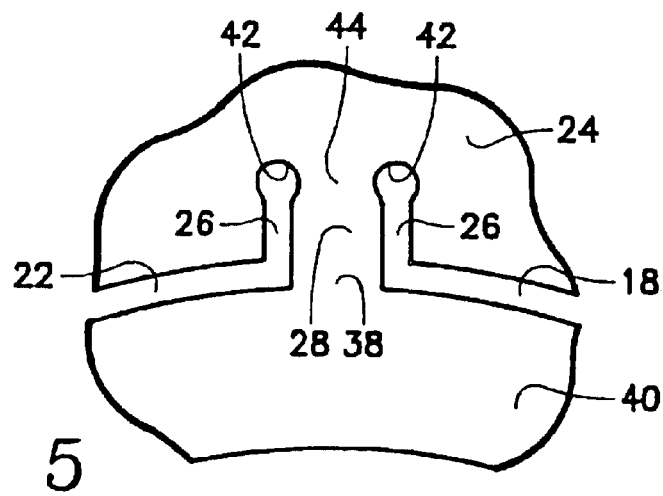
FIG. 5 is an enlargement of the frangible connection that is used to mount the bushing on the body.
Figure 6:
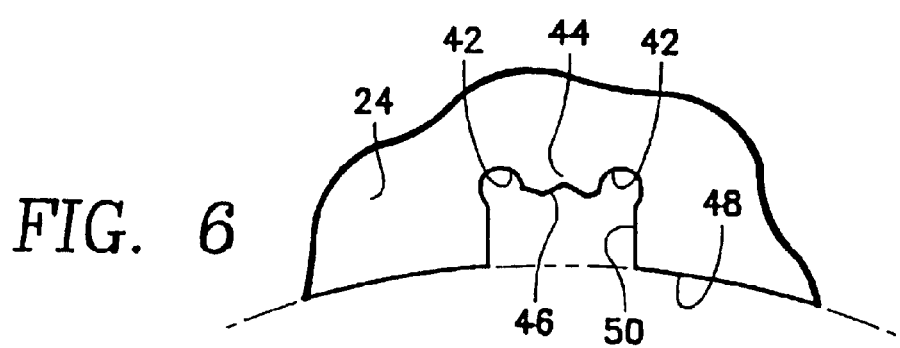
FIG. 6 is an enlarged view showing the frangible connection after it is broken.

At each end of each slit 18, 20 and 22 there is formed a radially outward extension 26. Therefore, it is understood that there are two in number of the extensions 26 for each slit 18, 20 and 22. Separating the radially outward extension 26 of slit 18 and the radially outward extension 26 of slit 22 is a tab 28. It is to be understood that there is a similar such tab 28 located between the radially outward extension 26 of slit 18 and slit 20 and a still further tab 28 located between the radially outward extension 26 of slit 20 and a separate outward extension 26 of slit 22. Therefore, there are three in number of the tabs 26. It is considered to be within the scope of this invention that one could use two in number of tabs 26 or there could be four in number of the tabs 28, which is shown in FIG. 3 of the drawings. In the case of FIG. 3, each of the slits 30, 32, 34 and 36 will be about ninety degrees apart rather than the one hundred twenty degrees of FIG. 2. It is also considered to be within the scope of this invention that there could be five in number of the tabs 28 and possibly even a greater number than five. It has been found that three in number of the tabs 28 works satisfactorily. It is important that when mounting of the core 10 on an arbor of a sawing machine and the inner center hole 12 is being used that no twisting or flexing of the core 10 is to occur relative to the arbor during rotating of the cutting blade. It has been found that using three or more in number of the tabs 28 prevents this flexing from occurring.

Each tab 28 has a base 38 which is integrally formed to a circular ring or bushing 40. Each tab 28 extends outwardly from bushing 40. The base 38 is substantially in alignment with a directly adjacent pair of slits, such as slits 18 and 22, slits 18 and 20 and slits 20 and 22. Each radially outward extension 26 terminates in a slightly increased size opening forming a bulbous hole 42. Between directly adjacent pairs of bulbous holes 42 there is a radially outward portion 44. Because of the bulbous holes 42, the width of the radially outward portion 44 is smaller than the width of the base 38. This means that when a physical force of sufficient magnitude is applied directly to the bushing 40 and only to the bushing 40 that a breaking will occur at the radial outward portions 44 which forms frangible connections. When the radial portion 44 is broken, there is formed a jagged surface 46. This jagged surface 46 is spaced from the outer center hole 48 which is now formed by the removal of the bushing 40. This means that the jagged surface 46 does not interfere with the outer center hole 48 so as to not interfere with the mounting of the outer center hole 48 on the larger size arbor of a saw machine. Because the radially outward portion 44 is of less width than the base 38 of each tab 28, the breakage will always occur at the radially outward portions 44. When the tab 28 has been broken, there is produced a cut-out 50 within the body 24 of the core 10.

What is claimed is:

1. A cutting disc core for a circular saw blade comprising:
   a circular shaped body having a center hole of a certain size and a continuous peripheral edge, said peripheral edge adapted to having cutting segments mounted thereon;
   a plurality of slits formed within said body located directly adjacent said center hole, said slits defining a generally circular configuration surrounding said center hole and located directly adjacent said center hole, said slits form a circular ring integrally connected to said body by a plurality of solid tabs, whereby said circular ring can be physically removed from said body by breaking of said tabs thereby increasing the certain size of said center hole to permit mounting of said body on a larger sized arbor of a sawing machine; and
   each said tab having a radially outward portion that is smaller in width than a base of said tab located in alignment with said slits, whereby breaking of each said tab to occur at said radially outward portion since the radially outward portion is weaker than said base because the radially outward portion is shorter in width than said base.

* * * * *